Jan. 12, 1960     L. HEIDMANN     2,920,565
HELICALLY WOUND METAL CARTRIDGE CASES
Filed July 9, 1956

United States Patent Office 2,920,565
Patented Jan. 12, 1960

2,920,565

HELICALLY WOUND METAL CARTRIDGE CASES

Leon Heidmann, Paris, France, assignor to Forges et Ateliers de Constructions Electriques de Jeumont, Paris, France, a corporation of France Application July 9, 1956, Serial No. 596,743

Claims priority, application France November 22, 1955

3 Claims. (Cl. 102—43)

This invention relates to cartridge cases having a tubular wall portion formed by a helically wound sheet of material with overlapping edges, and thus having a helical lap joint or seam formed on the external periphery.

It is known that helically wound metal cases are susceptible of developing a gas leak at the point where this helical seam of the tubular portion meets the base. The leak permits a slight escape or leakage of hot explosion gases which, because they are localized and because of their temperature and high velocity, are able to attack and erode the inner surfaces of the breech or bore of a cannon or gun in which such cartridge is fired.

It is the principal object of this invention to eliminate the undesirable effects of this type of leak instead of trying, as has been previously suggested, to eliminate completely all leakage of gases by sealing means, which are more complicated and expensive. In accordance with the invention, a tubular damping shield, preferably having a short axial length, encloses the tubular portion of the casing adjacent the base in such a manner as to spread out the flow of the gaseous leakage so as to reduce the gas pressure and cool said gases whereby the erosion is eliminated.

The invention is hereinafter described with reference to the accompanying drawings, which represent diagrammatically, and by way of example, one embodiment thereof. In the drawings, Fig. 1 is a partial vertical view of a conventional helically wound or wrapped metal cartridge case.

Figure 1:
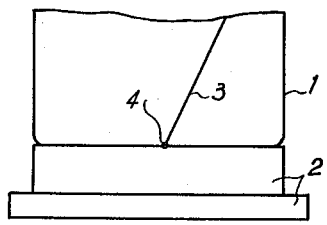
Figure 4:
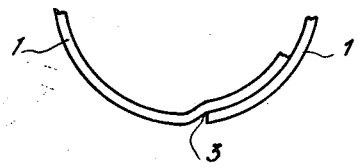
Fig. 4 is a horizontal cross-section taken along the line 4—4 of Fig. 3.

Referring to the drawings, Fig. 1 shows a conventional cartridge case of the type formed by helically winding a metal strip or sheet into a tubular portion 1 and secured to a metallic base 2 comprising a single member having a cylindrical part having a previously produced groove 6 for gripping the tubular portion 1. The wound sheet forms a helical or spiral external lap seam 3 along the full length of the tubular portion. At the point where this seam 3 meets the base, a leakage point 4 generally develops due to the overlapping of the wound sheet, in the manner shown in Fig. 4.

Figure 2:
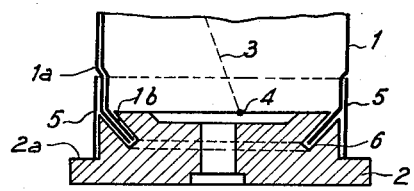
Fig. 2 is a partial vertical section of a cartridge case in accordance with the invention.

In accordance with the invention (Figs. 2 and 3) a damping shield 5, in the shape of a cylindrical collar, preferably having a short axial length, for example, approximately the same height as the base, surrounds the whole cylindrical part of the base 2 with its groove 6 and a short length of the tubular portion 1. The collar is then molded in position jointly with the tubular portion 1 during manufacturing operations by confining the wound tubular portion and the assembled collar 5 in a mold and applying high internal pressure, for example by means of the apparatus of my United States application Serial No. 327,756, filed December 24, 1952. By thus molding the assembled tubular portion 1 and collar 5, the tubular portion 1 is deformed as shown around the edge of the collar 5. In this manner, when the various members are assembled in the finished case, the collar fits between a deformation 1a of the tubular portion and a shoulder 2a of the base, being thus immovable in axial direction.

The tubular portion 1 is fixed with the collar 5 upon the base by the fact that an inturned end 1b of the tubular portion 1 is positioned in a suitable groove 6 which is compressed and closed to tightly grip inturned end 1b to assemble all of the parts together. It will be understood, however that the collar 5 merely acts as a screen but not as a fixing element.

The hot gases which may eventually escape through leakage point 4 of seam 3, are diverted by the collar 5 and may only reach the inner bore or the breech of the cannon or gun after having been deflected and diffused by the collar. These hot gases are thus forced to escape out of the top and bottom of the collar 5 at a reduced pressure and after being considerably cooled off. In view of the reduced velocity and temperature of the escaping gases, bore and breech erosion is eliminated.

Figure 3:
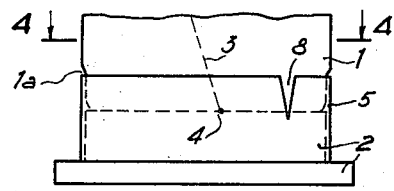
Fig. 3 is a partial vertical view of a cartridge case in accordance with the invention and showing the use of notches in the collar.

When a shell is fired the tubular portion of the cartridge case and the collar 5 are subjected to the pressure of expanding explosion gases; the upper part of the collar 5 therefore increases in diameter and is pressed against the surfaces of the bore of the cannon or gun. In order that the collar does not surpass its elastic limit during the course of this deformation, one or several notches 8 (Fig. 3) can be made on its upper part in any shape whatsoever and having a suitable depth for increasing its elasticity. The notches may be made by a saw-cut or by stamping, or by any other means. They are preferably spaced at a distance from point 4, as shown in Fig. 3, and their employment results in an elastic contraction of collar 5 so that the cartridge case may be readily removed from the breech after the gun is fired.

Aside from eliminating the erosion effect of the leakage gases, the collar 5 has the added advantage of preventing the possible unwinding of the sheet material forming the tubular portion 1.

It will be seen that the invention eliminates the disadvantages and difficulties pointed out as to conventional wrapped or helically wound cartridge cases by a simple and inexpensive means.

While a preferred embodiment of the invention has been illustrated and described, it will be understood that the invention is in any way limited to this embodiment and that many changes may be made within the spirit and scope of the invention as defined by the following claims.

What I claim and desire to secure by Letters Patent is:

1. In a shell case having a tubular portion comprising a metal sheet helically wound with overlapping marginal edge portions so as to form an external helical lap seam, said tubular portion having an inturned end, a metallic base comprising a single member fixed on said tubular portion, said base having a cylindrical outer portion and an inner portion defined by a frusto-conical groove on an upper face of the base in which said inturned end is clamped enclosing said base inner portion, shield means for reducing harmful effects of gas leakage through said lap seam onto a gun breech consisting of a gas pressure and temperature damping metallic shield having the configuration of a gas-impervious short cylindrical collar, said collar being disposed encircling said inner and outer base portions and the groove and encircling a short length of said tubular portion adjacent said base so as to allow axial gas flow between said collar and the tubular portion, whereby gases leaking through said seam at a point adjacent said base and radially inwardly of the collar are diffused by the collar and reduced in pressure and temperature to preclude erosion of the gun breech.

2. In a shell case according to claim 1, in which said shield means is provided with at least one notch on its upper edge and said notch is spaced from the point where said seam joins said base, and in which said shield means has an axial height substantially equal to the height of the base.

3. In a shell case, a tubular portion comprising a metal sheet helically wound with overlapping marginal edge portions so as to form an external helical lap seam, said tubular portion having an inturned end and a circumferential recessed area adjacent said inturned end and having a circumferential shoulder formed by said recessed area, a metallic base comprising a single member fixed on said tubular portion and having a peripheral shoulder and a groove on an upper face in which said inturned end is clamped, gas diffusive means comprising a short cylindrical gas-impervious, collar encircling a portion of said base and said recessed area of said tubular portion disposed so as to allow gas flow in a direction axially of the tubular portion between the collar and the tubular portion recessed area in the event of a gas leak in said lap seam at a point thereon disposed radially inwardly of the collar, said collar being positioned between and engaging said peripheral shoulder of the base and said circumferential shoulder of the tubular portion, whereby said collar is held against axial movement.

References Cited in the file of this patent

FOREIGN PATENTS

| | | |
|---|---|---|
| 68,701 | Germany | May 17, 1893 |
| 525,212 | France | May 30, 1921 |
| 341,861 | Germany | Oct. 10, 1921 |
| 454,091 | Great Britain | Jan. 9, 1936 |
| 731,749 | Germany | June 3, 1943 |
| 484,990 | Canada | July 22, 1952 |